Feb. 5, 1935.  R. C. WEISHAMPEL  1,989,835
MACHINE TOOL
Filed Jan. 20, 1931   5 Sheets-Sheet 1

INVENTOR
Robert C. Weishampel
BY
ATTORNEY

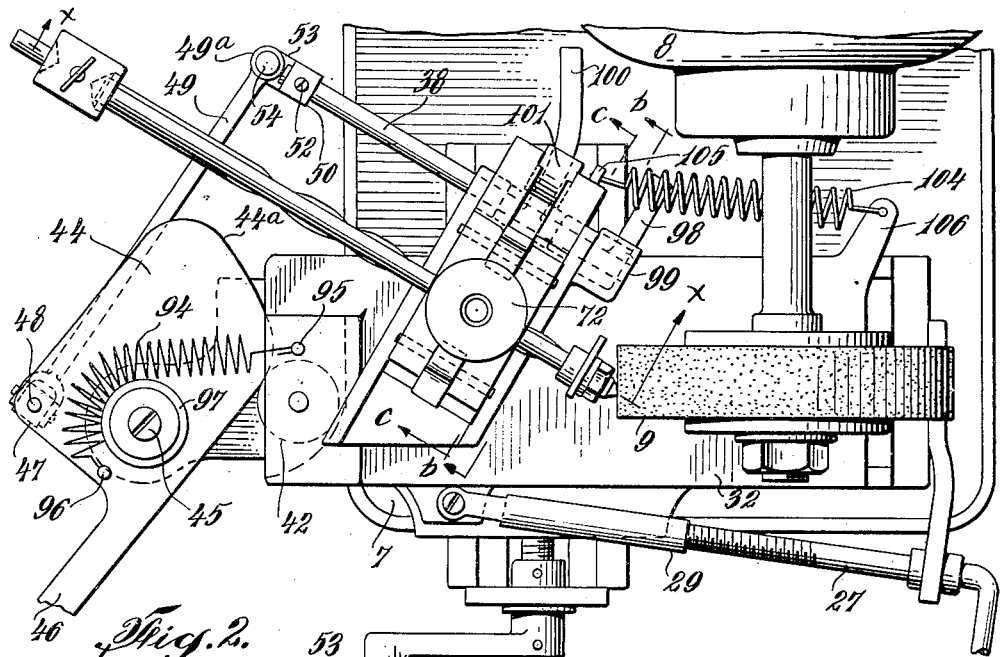
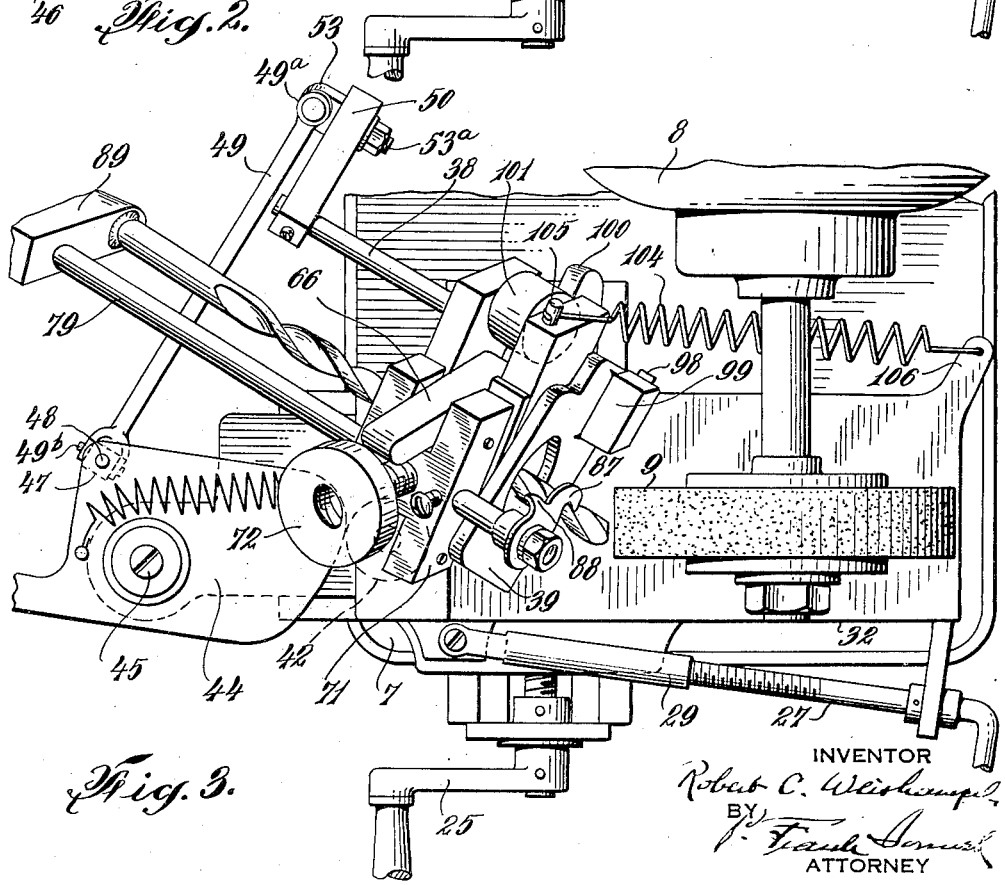

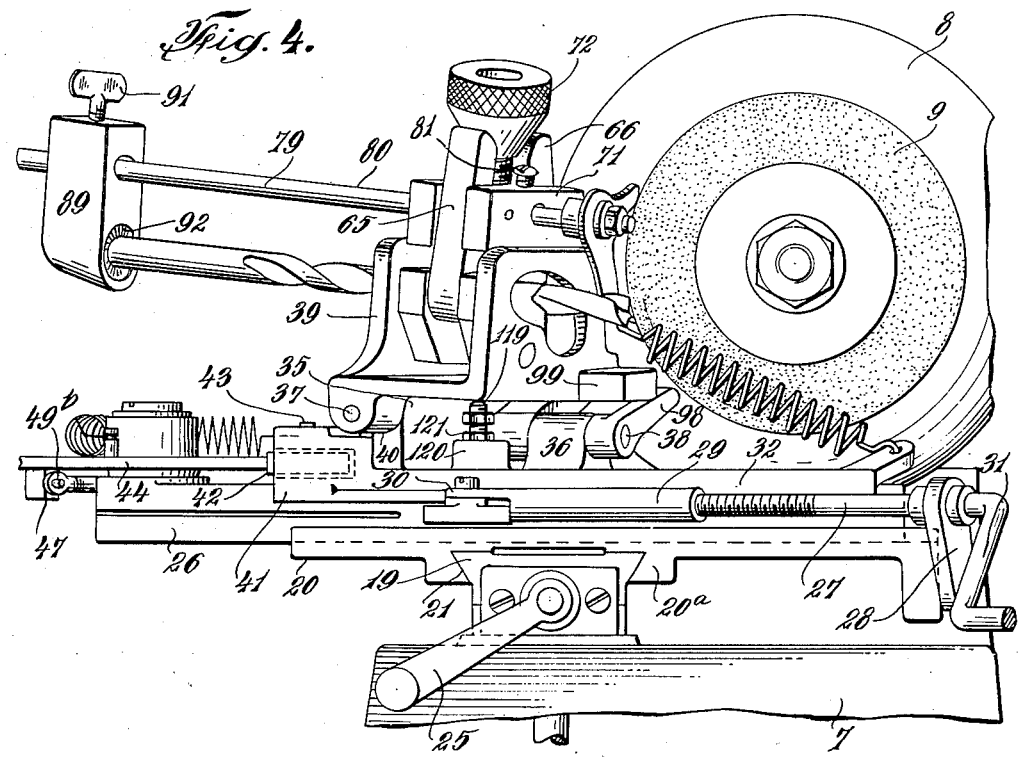

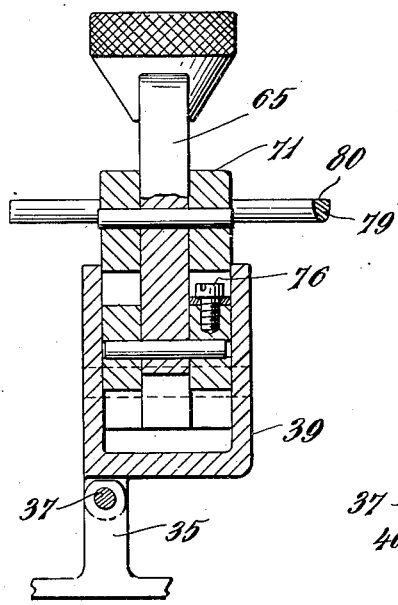
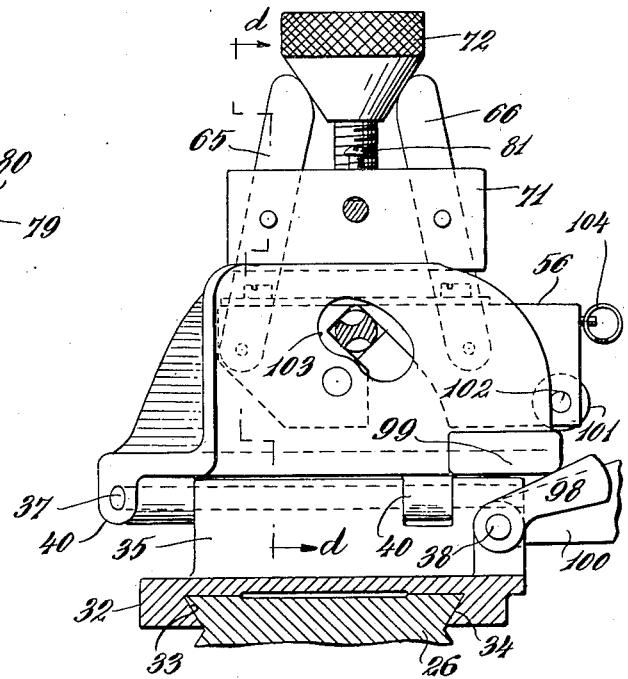

Feb. 5, 1935. R. C. WEISHAMPEL 1,989,835
MACHINE TOOL
Filed Jan. 20, 1931 5 Sheets-Sheet 5
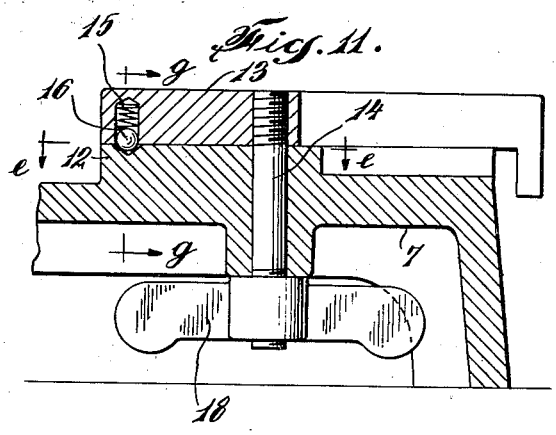
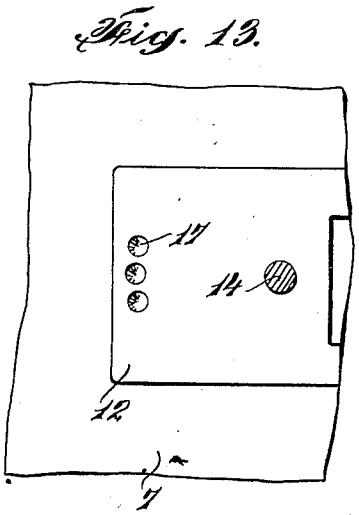
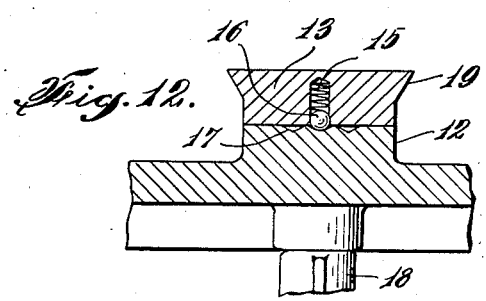
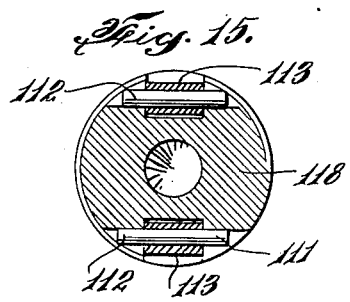
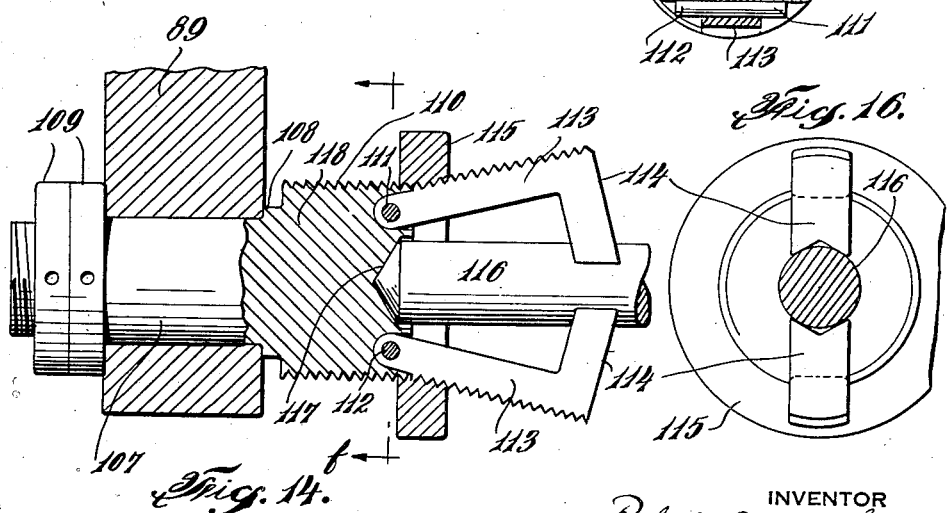
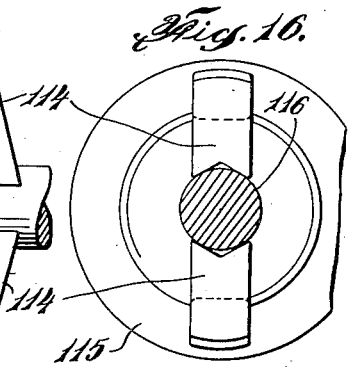
INVENTOR
Robert C. Weishampel
BY
Frank Sorrell
ATTORNEY Patented Feb. 5, 1935

1,989,835

UNITED STATES PATENT OFFICE 1,989,835

MACHINE TOOL

Robert C. Weishampel, Paterson, N. J., assignor of one-third to P. Frank Sonnek, Woodhaven, N. Y., and two-thirds to Theophile J. Galipo, Paterson, N. J.

Application January 20, 1931, Serial No. 509,900

13 Claims. (Cl. 51—219)

REISSUED

This invention relates generally to machine tools and is more particularly directed to a mechanism for performing grinding operations, as in sharpening so-called twist drills and other cutting tools, or in shaping stock or manufactured parts, the mechanism also being susceptible of use in polishing and numerous other operations in processes employed in the production of articles of various materials.

While, as pointed out, my invention has a wide range of application as a machine tool, for the purposes of this disclosure I have elected to illustrate and describe it as it may be utilized in grinding or sharpening twist drills. It will be understood, however, that this is merely illustrative and does not constitute a limitation of my invention to this particular use, as it will be clearly evident as the description proceeds that the mode of operation of my mechanism renders it adaptable to the performance of many other kinds of work.

As is well known in the art, a drill, in order that it may render efficient service, must be accurately ground or sharpened. Both cutting lips must be inclined at the same angle with the axis of the drill and must be of equal length, while the drill point must have the proper surface contour back of the cutting edges, and the clearance afforded by this contour must be identical on both sides. The point angle which has been universally adopted as best suited for average working conditions is 59 degrees, while the clearance angle is fixed at approximately 12 degrees with a center angle of 130 degrees. Drills are now almost universally ground or sharpened by hand and only the most skilled and experienced mechanics are able to perform a grinding operation which has any semblance of real accuracy.

Numerous automatic, semi-automatic, or manually-actuated machines or mechanisms for performing the operations necessary to properly sharpen or grind twist drills have been devised, but none of them have been found to satisfactorily meet all of the requirements of production processes. In some instances these machines or mechanisms are of a design which render their use more or less prohibitive from an economic standpoint, while in others the necessary accuracy in grinding cannot be assured, without frequent adjustments, and, in many cases, the introduction of supplementary hand operations.

From the foregoing it will be manifest that no means is now available which combines all of those characteristics that are essential to a practical and accurately functioning mechanism that may be economically produced, so that the advantages flowing from such a mechanism may be generally realized in the practicing of many industrial and other processes, where existing methods of drill-grinding add materially to the ultimate costs of production.

Therefore, it is the primary object of this invention to provide a machine or mechanism which will possess those characteristics that it has been demonstrated are essential to overcome the objections raised to the prior art devices, so that the uncertainties of drill-grinding operations, with their concomitant production losses may be effectually eliminated, in a simple, practical and economical manner.

Further, it is an object of this invention to provide a machine or mechanism which, while especially adapted for use in grinding or sharpening twist drills, may be employed in the performance of various other operations to which it may be adaptable, the machine or mechanism being of a construction that will insure a maximum degree of accuracy in the performance of a specific work to which it may be applied, when operated by the unskilled as well as by the skilled or experienced mechanic or factory hand.

It is also an object of my invention to provide a grinding tool that may embody those features which are essential to a portable device or that may be incorporated in the structure of another machine tool, or may be set up in a permanent or semi-permanent location, as may be desired, or may be found necessary to meet particular requirements in use.

More specifically, my invention is directed to a preferred combination of a grinding element, such as an emery wheel, directly driven by a suitable power-generating element, or by remote means, and a, preferably, manually actuatable mechanism whereby the desired operations to be performed upon the work by the emery wheel may be accomplished by a multiplicity of movements of said mechanism through intersecting arcs and in different planes by a single continuing movement of the control element of the mechanism by the user of the machine.

In order to accomplish the results to which my invention is directed, it is essential that simple and effective means be provided for properly locating the work within the actuatable mechanism and for securely retaining the work in said position for the necessary operations which are to be performed thereon by the emery wheel, or polishing wheel, or other implement as may be desired, the means which are utilized for the aforesaid purposes being of a simple and effective design and possessing features which render them applicable to many other uses, apart from those specifically ascribed to them in the present treatment of my invention.

Other objects and advantages flowing from the practicing of my invention will doubtless become apparent as the description proceeds, and I would have it clearly understood that I reserve unto myself all rights to the full range of equivalents, both in structure and in use to which I may be entitled under my invention in its broadest aspect.

In the accompanying drawings I have illustrated a specific embodiment of my invention, together with certain modifications of various elements thereof, as it functions in a specific one of its many applications, viz., grinding or sharpening a twist drill. However, my invention may take other forms and the components of my mechanism may be varied in shape or in their relation, one to the other, as may be found necessary to attain the objectives to which it is directed, as herein set forth, without departing from the spirit and scope thereof as defined by the appended claims.

In the drawings:

Figure 2 is a top plan view of a part of a structure shown in Figure 1, showing the position of the drill carrier relative to the periphery of the emery wheel in the first stage of the grinding operation.

Figure 3 is a view similar to Figure 2 illustrating the relative positions of the components of the mechanism during sequential stages of the grind operation.

Figure 4 is a side elevation of the structure shown in Figure 2.

Figure 5 is a sectional detail of the work-clamping means of the carrier portion of the grinding mechanism or machine, on the line $x$—$x$ of Figure 2.

Figure 6 is a view in elevation of the adjustable work-holding element, looking in the direction of the arrows $a$—$a$ of Figure 5.

Figure 7 is an enlarged view of a portion of the work-supporting means taken on the line $b$—$b$ of Figure 2.

Figure 8 is a sectional view of the structure shown in Figure 7 taken through the line $c$—$c$ of Figure 2.

Figure 9 is a transverse section on the line $d$—$d$ of Figure 7.

Figure 10 is a view in perspective of the disassociated elements which cooperate to form the adjustable work-holding means functioned by the operation of the conical nut shown in the preceding figures.

Figures 11 and 12 are sectional details of the positioning and locking means for maintaining pre-determined adjustments of the slideway relative to its support, Figure 12 being a transverse view on the line $g$—$g$ of Figure 11.

Figure 13 is a bottom plan view on the line $e$—$e$ of Figure 11.

Figure 14 is a view partly in section of a modified form of chuck or means for engaging the shank end of a drill or other piece of work supported in the carrier frame.

Figure 15 is a transverse section on the line $f$—$f$ of Figure 14, and

Figure 16 is a view in elevation looking from the right of Figure 14.

Figure 1:
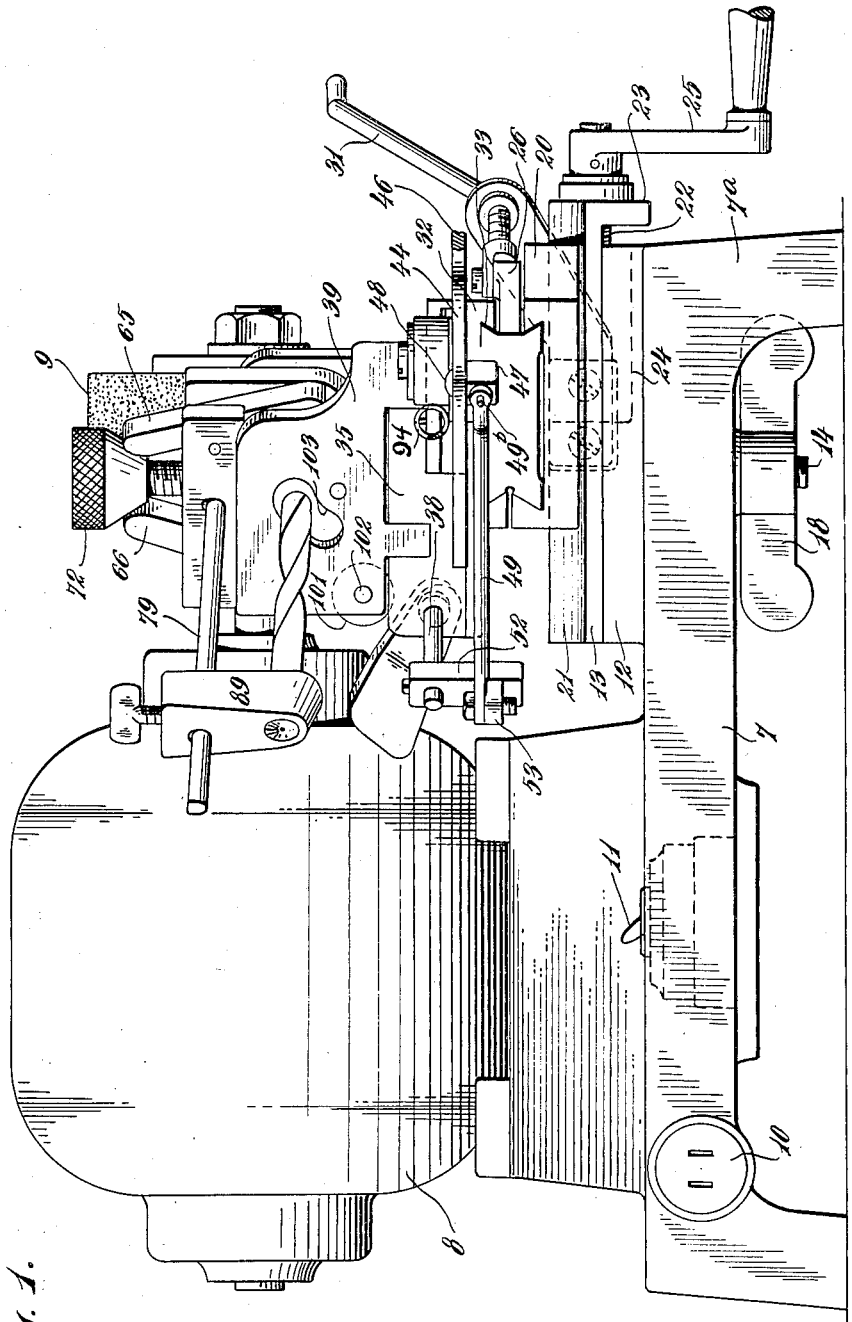
Figure 1 is an end elevation of a machine or mechanism of a portable type embodying my invention, showing a drill in position therein for the initiation of the grinding operation.

Referring now to the drawings in detail, in which like characters of reference are employed to designate similar parts in the several views, 7 indicates the bed or supporting frame of the machine or mechanism, preferably rectangular in shape, which may be provided with the usual standards or legs 7$^a$, the particular device shown being of the portable type, so that it may be transported from place to place for use wherever desired. This bed carries a suitably mounted electric motor 8 on the armature shaft of which is detachably mounted an emery wheel 9, the disposition of the motor being such that the emery wheel will be in advance or normally spaced from the work-carrying mechanism as and for the purpose herein explained. Of course, as will be obvious, in the use of this machine, the emery wheel 9 may be removed from its supporting shaft and a polishing disc or wheel, or other element substituted therefor.

Suitable wiring to the receptacle 10 permits of the connection of the motor by means of the usual plug to a source of electric energy which may be controlled by a toggle or other form of switch, as shown at 11.

The aforesaid bed or frame 7 embodies a preferably integral pad 12 disposed transversely thereof which functions as a support for a slideway 13, rotatable relatively thereto on the axis of the screw 14. The slideway 13 is recessed adjacent one end, as at 15, to receive a spring actuated ball 16 that is adapted to register with a predetermined one of a series of semi-spherical seats or depressions 17 in the upper surface of the pad 12, it being apparent that as the slide-way 13 is rotated on its aforesaid axis the ball in cooperation with one of said seats 17 will serve as a locating means in obtaining the desired angular adjustment of the slide-way, the latter being securely locked in its adjusted position by means of the wing nut 18.

Supported upon the slide-way 13 which is provided with suitable gibs 19 is a plate 20 formed with a thickened portion 20$^a$ having grooves or channels 21 adapted to register with said gibs to retain said plate 20 in slidable engagement with the aforesaid slideway 13, the movement of said plate along said slideway being effected by means of the screw 22 supported in the apron 23 integral with the slideway 13 and meshing with the sleeve 24 dependent from the underside of said plate 20. The said screw 22 may be actuated by any suitable means as the crank indicated at 25.

Mounted upon the plate 20, in sliding engagement therewith, is a table 26, the movement of which longitudinally of the plate 20 is effected by means of a screw 27 supported in a bracket 28 fixed to the plate 20 in threaded engagement with the sleeve 29, pivoted to said table 26 as at 30, the said screw being actuated by means of a crank 31.

Supported upon the table 26, in slidable engagement therewith, is a carrier 32 channeled as at 33 to ride upon the complemental surfaces 34 of the table 26.

As will be observed, the carrier 32 is formed with upwardly directed protuberant portions 35 and 36 which are bored to form journals for the shafts 37 and 38, the former carrying a cradle 39 provided with laterally spaced dependent ears 40 in which said shaft is mounted. In juxtaposition to said protuberance 35 the carrier 32 is formed with an abutment 41 which is recessed to receive a roller 42 rotatable on the pin 43, this roller being adapted to be engaged by a cam 44 moving on the axis 45 and provided with an arm or extension 46 whereby it may be manually actuated as and for the purposes hereinafter explained.

Dependent from said cam 44 is a fitting 47 pivotally mounted on a pin 48, to which one end of a link 49 is connected for relative movement on an axis transverse of that of said pin, as indicated at 49b, the other end of said link being connected to the fitting 50, fixed to the shaft 38 by means of the set screw 52, for relatively universal movement. As shown this latter connection includes a lug 53 mounted in the fitting 50 for rotation upon its axis 53a, the bearing end 49a of the link 49 being pivoted to said lug by a screw or stud 54.

From the structure thus far described, it will be manifest that the plate 20, the table 26, and the carrier 32, may be actuated longitudinally of the slideway 13 and that the latter is capable of a predetermined radial movement relative to the pad 12 which is a part of the supporting frame or base 7; also, that the table 26 is capable of movement longitudinally of the plate 20, by the actuation of the screw 27.

The cradle 39, which comprises a base portion and upwardly projecting sides, in combination with suitable clamping elements and means for functioning the latter, constitutes the work-holding portion of the mechanism. The clamping elements consist of two members 55 and 56, formed with opposed registering and interengaging inclined surfaces, generally indicated at 55a and 56a, the member 55 being apertured at 57 to receive a pin 58, mounted in the opposite side walls of said cradle. Supported from the top of the cradle is an H-shaped member 71 having a vertically disposed bore 59 extending through its transverse wall to receive a screw 60, which may be non-rotatably fastened therein by any suitable means. The opposed side walls of said member are respectively apertured at 61 and 62 to receive the pins 63 and 64 which carry arms or levers 65 and 66, the lower ends of which are located within the slots 67 and 68 of the members 55 and 56 for pivotal connection thereto by pins 69 and 70. Thus, it will be seen that as the conical nut 72 is turned down upon the screw 60 the ends of the arms 65 and 66, which are shaped for surface contact with said nut, are urged outwardly, causing the clamping elements 55 and 56 to approach each other so as to render their work-engaging surfaces or jaws effective upon the work as hereinafter explained, the said elements being maintained in cooperative alignment by the plate 73 provided with elongated slots at 74 and 75 which ride upon the screws 76 and 77, seated respectively in the clamping elements 55 and 56. Of course, the movement of the nut 72 in the reverse direction will permit the clamping elements to recede from each other.

A horizontal bore 78, extending centrally through the H-shaped member 71, is adapted to receive a rod 79, the upper surface of which is flat as shown at 80, the said rod being locked in said bore by means of the set screw 81. This rod is provided adjacent one end with a shoulder 82 to form a stop for a collar 83 between which and the nut 84, threaded on the end of said rod 79, the hub 85 of a dog 86 is mounted for rotative movement, the said dog having a nose or projection 87, adapted to engage a surface of the work and a finger-piece 88 whereby it may be moved into and out of functioning position. A block 89, provided with a horizontal bore adjacent its upper end, is slidably mounted upon said rod 79, and is adapted to be locked in adjusted position by the thumb screw 91. This block is preferably provided with tapered cavities or recesses of different diameters and depths in its opposite faces, as indicated at 92 and 93, respectively. These cavities are designed to provide seats which are adapted to engage the end of the piece of work which is held between the clamping elements 55 and 56, it being obvious that the position of the block 89 on the rod 79 may be reversed so that the block may satisfactorily function with stock or work having different diameters.

Now, assuming that it is designed to grind or sharpen a drill, the latter is inserted between the opposed jaws of the clamping elements 55 and 56 with its point in advance of the dog 86 and the nose 87 thereof which is notched for the purpose, is engaged with the spiral defining the upturned groove of the drill, the nut 72 having, in the meantime, been actuated just enough to retain the drill in set position between the clamping elements. The block 89 is now pressed hard against the end of the shank of the drill, which seats itself in the cavity 92, so that the drill is thus accurately lined up from cutting point to end and true to its diameter. The nut 72 is now turned to complete the clamping operation of the jaw members 55 and 56, the drill, as will be noted from the drawings, being rigidly supported thereby in a plurality of longitudinally spaced zones.

When the drill has been properly located in the work-holder the table 26 is moved longitudinally of the plate 20 by the actuation of the screw 27 to bring the drill point into the proper proximity to the periphery of the emery wheel 9. Also, the screw 22 may be operated, if necessary, to protect the emery wheel against grooving or undue wear, it being apparent that if the mechanism was not adjustable transversely of the emery wheel, the effective life of the latter would be of short duration.

With the emery wheel rotating, the grinding operation may now be performed by the operator grasping the arm or handle 46 of the cam plate 44 and moving it to the left, which causes the cam surface 44a, in engagement with the roller 42 to urge the carrier 32, with its supported elements toward the revolving emery wheel, in opposition to the spring 94 fixed to said carrier at 95 and to said cam plate at 96, the said spring bending about the roller or hub 97 to vary its effectiveness.

Simultaneously with the functioning of the cam plate 44, and in properly timed sequence, the cam 98 fixed to the shaft 38 in engagement with the toe 99 projecting from the cradle 39 initiates an upward arcuate movement of the cradle 39 on its shaft 37, while the cam 100, likewise fixed to the shaft 38, and curved longitudinally to enter the slot 68 of the clamping element 56, traverses the roller 101 mounted within said slot 68 on a pin 102, to rock said clamping elements, in interlocking engagement with the drill, on the pin 58, the drill riding within the elongated arcuate slots 103 provided in the opposite side walls of the cradle 39. The movement of the cradle on its axis 37 and of the work-clamping unit on the pin 58 is effected by the respective cams 98 and 101 in opposition to the spring 104, one end of which is fixed to the clamping element 56 as at 105, while the other end is attached to a laterally extending lug 106 on the carrier 32. At the conclusion of the movements of the carrier, cradle, and work-holder just described, produced by the single continuing movement of the cam plate 44, the latter is actuated in reverse direction which, obviously, effects a reversal of the sequence of movements of the several parts actuated by the cams 100, 98, and 44ª. When one lip of the drill has been operated upon, the nut 72 is slightly loosened to permit the position of the drill to be changed in the work-holder so that the other lip may be sharpened, the nut 72 again being tightened when the drill has been adjusted to its new position and the grinding operation performed as hereinbefore described.

As will be noted, the cradle 39 is normally supported in advance of its line of axial movement by a screw 119 which is threaded in the boss 120 on the carrier 32 to provide for such vertical adjustment of the cradle as may be necessary, in properly locating the work relative to the emery wheel 9 or other element, the screw being locked in position by the nut 121.

I have found from actual practice that, by the employment of my invention as herein set forth, I am enabled to obtain absolute accuracy in the grinding or sharpening of a drill, the sequential movements of the carrier, the cradle, and the chuck or clamping element producing a drill point which corresponds in every particular to the specifications which are universally recognized as being essential in a correctly pointed drill as hereinbefore set forth, it being understood, of course, that my mechanism possesses a sufficient range of adjustability to produce any desired variables from the standard specifications. Again, as will be evident from this disclosure, my mechanism may be employed with equally efficient and satisfactory results in shaping stock or manufactured material, for various purposes and in many other grinding or sharpening operations as well as in polishing, it being a simple matter to remove the emery wheel and substitute a polisher therefor.

While I have described my invention with particular reference to the embodiment herein illustrated, it will be manifest that various changes in providing the necessary adjustments of the plate 20, the table 26, and the carrier 32, relative to each other and with relation to the slideway 13, and of the latter with respect to the pad 12 or supporting frame 7, for angular variations, may be made to conform to production or other requirements. Also, the means for holding the work in position for the grinding or other operation and the location of the actuating cams, and their method of functioning may be changed within the purview of the claims and without departing from the spirit and scope of this invention. As an example, in lieu of the block 89 with its recesses 92 and 93, this block or a similar one suspended from the rod 79 may be apertured to receive the reduced end of a fitting 107 having a shoulder 108 whereby said fitting may be locked to said block by the collars 109 in threaded engagement with the protruding end of said reduced portion 107, the said fitting embodying a threaded hub 110 in which is pivoted at 111 and 112 a pair of arms 113 having angular portions 114, the extremities of which are recessed as shown in Figure 16. These arms 113 are peripherally threaded for engagement with the internal threads of the collar 115 and, as will be obvious from Figure 14, the said arms are adapted to exert clamping effort upon the work 116, positioned in the cavity 117 in said hub, as the collar 115 is actuated upon the arms in the direction of their free ends. The inward movement of the collar, of course, onto the hub 118 relieves the arms of pressure and permits of the disengagement of the work therefrom.

I claim:

1. In combination with an emery wheel or the like, a mechanism for supporting a piece of work in position for grinding to a predetermined contour by said emery wheel, said mechanism embodying means for effecting the adjustment thereof in paths parallel to and intersecting the axis of said emery wheel, a work-holding device rockable on an axis normally parallel to the axis of rotation of the emery wheel, work-clamping means rockably connected to said device for movement on an axis intersecting the axis of said work-holding device and means operable, by a single continuing movement, to move said work-holding device towards said emery wheel and in sequence rock said device and said work clamping means forming a part thereof on their respective aforesaid axes, said operating means including a hand-actuatable cam, a shaft connected thereto and a pair of cams fixed to said shaft for respectively actuating said work-holding device and said work-clamping elements.

2. A grinding machine, embodying a bed, a rotatable grinding implement mounted thereon and a mechanism for supporting a piece of work in the performance of a grinding operation, said mechanism including a slideway, a plate adjustable longitudinally of said slideway, a table slidably movable along said plate, a carrier movable longitudinally of said table, a cradle rockably mounted upon said carrier, work-holding means carried by said cradle for arcuate movement on an axis transverse to the axis of movement of said cradle, a cam plate mounted on said table for engagement with said carrier, a shaft journalled on said carrier, cams carried by said shaft having effective surfaces formed to engage said cradle and said work-holding means, a connection between said cam plate and said shaft and means for actuating said cam plate to effect a sequential movement of said carrier, said cradle and said work-holding means, all of said movements being accomplished by a continuing movement of said cam plate.

3. A grinding machine, embodying a bed, a rotatable grinding implement mounted thereon and a mechanism for supporting a piece of work in the performance of a grinding operation, said mechanism including a slideway, a plate adjustable longitudinally of said slideway, a table slidably movable along said plate, a carrier movable longitudinally of said table, a cradle rockably mounted upon said carrier, work-holding means carried by said cradle for arcuate movement on an axis transverse to the axis of movement of said cradle, a cam plate mounted on said table for engagement with said carrier, a shaft journalled on said carrier, cams carried by said shaft having effective surfaces formed to engage said cradle and said work-holding means, a connection between said cam plate and said shaft, spring means connecting said cam plate to said carrier, a spring connecting said work-holding means to said carrier and means for actuating said cam plate in opposition to said spring means and said spring to effect a sequential movement of said carrier, said cradle and said work-holding means.

4. A grinding machine embodying a bed, a rotatable grinding implement mounted thereon and a mechanism for supporting a piece of work for the performance of a grinding operation, said mechanism including a slideway pivotally connected to said bed for radial adjustment relative thereto, a plate adjustable longitudinally of said slideway, a table slidably movable along said plate, a carrier movable longitudinally of said table, a cradle rockably mounted upon said carrier, work-holding means carried by said cradle for arcuate movement on an axis transverse to the axis of movement of said cradle, a cam plate mounted on said table for engagement with said carrier, a shaft journalled on said carrier, cams carried by said shaft having effective surfaces formed to engage said cradle and said work-holding means, a connection between said cam plate and said shaft and means for actuating said cam plate to effect a sequential movement of said carrier, said cradle and said work-holding means, all of said movements being accomplished by a continuing movement of said cam plates.

5. A grinding machine embodying a bed, a rotatable grinding implement mounted thereon and a mechanism supporting a piece of work in the performance of a grinding operation, said mechanism including a work-holding element comprising a frame, a pair of jaw members mounted within said frame, one of said jaw members being pivotally connected to said frame, a member freely supported upon said frame in superposed relation to said jaw members, a pair of arms fulcrumed in said superposed member, one of said arms being pivotally connected to each of said jaw members, a screw carried by said superposed member and means operable upon said screw for engaging said arms to effect a positive movement of said jaw members into work-holding position.

6. In a mechanism for supporting a piece of work in the performance of a grinding operation or the like thereon, a carrier adapted for movement toward and from the operation performing element, a work-holding device embodying a frame hinged to said carrier for arcuate movement through a vertical plane, work-clamping means carried by said frame comprising a pair of members having inclined registering surfaces forming work-engaging jaws, said members being mounted in said frame for relative movement on an axis intersecting the axis of movement of said frame, means for actuating said members toward each other for clamping a piece of work between said jaws and means supported in longitudinally spaced relationship to said jaws, for engaging another part of the work clamped within said jaws.

7. In a mechanism for supporting a piece of work in the performance of a grinding operation or the like thereon, a carrier adapted for movement toward and from the operation performing element, a work-holding device embodying a frame hinged to said carrier for arcuate movement through a vertical plane, work-clamping means carried by said frame comprising a pair of members having inclined registering jaw-forming surfaces, one of said members being pivoted to said frame for movement on an axis intersecting the axis of movement of said frame, means for actuating said members toward each other for clamping a piece of work between said jaws and means supported from said frame for adjustment longitudinally of a piece of work held between said jaws to cooperate with the latter for maintaining the work in a predetermined position for the operation thereon.

8. In a work-holding device of a grinding machine having a frame, a pair of work-engaging elements comprising relatively oppositely reciprocable members mounted within said frame and provided with a plurality of inclined surfaces defining angular protuberant portions and recesses, the protuberances of one member being adapted to enter the recesses of the other, one of said members being pivoted to said frame and means dependent upon said frame for effecting a positive movement of said members in opposite directions to function the registering portions to apply clamping effort to a piece of work centered therebetween.

9. In combination with a mechanism associated with a grinding element, a work support comprising a member supported from said element and apertured to receive a fitting embodying a threaded hub portion, a pair of arms pivotally mounted within said hub, diametrically opposite each other, said arms having threaded peripheral portions and angular work-engaging surfaces offset from said threaded portions and a collar internally threaded for engagement with said hub and the threaded portions of said arms, said collar being adapted to exert pressure upon said arms to produce clamping effort on a piece of work positioned between said arms.

10. A mechanism for subjecting a piece of work to the action of an abrasive element, comprising supporting means, a work carrier mounted on said means for rocking movement, oppositely adjustable work-engaging elements rotatably connected to said carrier, a single means for functioning said elements to circumferentially engage and hold the work relatively immovable therebetween, means for initially adjusting said supporting means relatively to the abrasive element to bring the work into a predetermined spaced relationship therewith and a manually actuatable device effective, upon said supporting means and operable in a single continuing movement, to sequentially urge said supporting means toward said abrasive element, rock said carrier relatively thereto and move said work-engaging elements on its rotatable connection to said carrier, the movements of the carrier and work-engaging elements occurring with the work in contact with said abrasive element.

11. A mechanism for subjecting a piece of work to the action of an abrasive element, comprising a support, a work-carrier mounted on said support for relative rocking movement, relatively oppositely adjustable elements for clampingly engaging the work supported by said carrier for rotative movement, relatively to said carrier, means for initially adjusting said support relatively to the abrasive element to bring the work into a pre-determined spaced relationship therewith and a manually actuatable device, effective upon said support, to move said support toward said abrasive element, rock said carrier relatively thereto and rotate said work-engaging elements relatively to said carrier, in sequence, in response to a single continuing movement of said device the movements of the carrier and the work-engaging elements occurring with the work in contact with said abrasive element.

12. A mechanism for subjecting a piece of work to the action of an abrasive element, comprising a bed, a support, slidably mounted thereupon for movement toward and from said abrasive element, a work-carrier mounted on said support for relative rocking movement, oppositely disposed work-engaging elements associated with said carrier for relative rotative movement, said elements being relatively adjustable to clamp the work therebetween, a manually actuatable device mounted upon said bed formed for propelling engagement with said slidable support and mechanism adapted to function in response to the actuation of said support, whereby a single continuing movement of said device in one direction will urge said slidable support towards said abrasive element and sequentially rock said carrier relatively to said support and rotate said work-engaging elements relative to said carrier, the movements of the carrier and work-engaging elements occurring with the work in contact with said abrasive element.

13. An apparatus for subjecting a piece of material to the action of an abrasive element, including a bed, a support slidable thereon, a work-carrier mounted on said support for relative rotative movement, oppositely adjustable means adapted to circumferentially engage a piece of work in a zone intermediate its ends to hold said work relatively immovable therebetween, said means being capable of rotative movement relative to said work-carrier, mechanism for effecting relative independent rotative movement of said work carrier and said work-engaging means in response to the movement of said support, a cam for applying propelling effort to said support and means for actuating said cam to urge said support toward the abrasive element and function said mechanism to sequentially effect rotative movement of said work-carrier and said work-engaging means.

ROBERT C. WEISHAMPEL.